US012452642B2

(12) United States Patent
Ligeret (10) Patent No.: US 12,452,642 B2
(45) Date of Patent: Oct. 21, 2025

(54) LOCATION-BASED S-CSCF SELECTION IN AN IMS NETWORK

(71) Applicant: T-Mobile USA, Inc., Bellevue, WA (US)

(72) Inventor: Xavier Ligeret, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 547 days.

(21) Appl. No.: 17/892,959

(22) Filed: Aug. 22, 2022

(65) Prior Publication Data

US 2024/0064504 A1 Feb. 22, 2024

(51) Int. Cl.
| | |
|---|---|
| *H04W 8/04* | (2009.01) |
| *H04L 61/4511* | (2022.01) |
| *H04W 4/029* | (2018.01) |
| *H04W 60/00* | (2009.01) |

(52) U.S. Cl.
CPC ........... *H04W 8/04* (2013.01); *H04L 61/4511* (2022.05); *H04W 4/029* (2018.02); *H04W 60/00* (2013.01)

(58) Field of Classification Search
CPC ....... H04W 8/04; H04W 4/029; H04W 60/00; H04W 8/08; H04W 28/18; H04W 48/18; H04L 61/4511; H04L 61/4588
See application file for complete search history.

(56) References Cited

U.S. PATENT DOCUMENTS

| | | | |
|---|---|---|---|
| 9,036,541 B2 | 5/2015 | Narkar et al. | |
| 2013/0095782 A1* | 4/2013 | Hao | H04W 28/18 |
| | | | 455/404.1 |
| 2023/0141522 A1* | 5/2023 | Sinha | H04W 8/08 |
| | | | 455/414.1 |
| 2025/0039820 A1* | 1/2025 | Tiwari | H04W 48/18 |

FOREIGN PATENT DOCUMENTS

WO WO-2018068611 A1 * 4/2018

OTHER PUBLICATIONS

Oracle Communications Unified Session Manager Essential Guide, S-CZ8.2.5, f29204-06, Apr. 2021 (Year: 2021).*

* cited by examiner

*Primary Examiner* — Vinncelas Louis
(74) *Attorney, Agent, or Firm* — Lee & Hayes, P.C.

(57) ABSTRACT

Methods and systems for a location-based serving call session control function (S-CSCF) selection in an IP multimedia subsystem (IMS) network is disclosed. According to an implementation, an interrogating CSCF (I-CSCF) of an IMS network receives a request to register a user equipment (UE) to use an IP multimedia service. The request may be a session initiation protocol (SIP) register. The I-CSCF determines that the UE is located in a first region based on the geographic information in the request. The I-CSCF may determine, based at least in part on the cell global identity (CGI) information in the SIP register, that the UE is previously registered through a different region. The I-CSCF may determine a serving CSCF (S-CSCF) located in the first (Continued)

region to provide the IP multimedia service to the UE. The I-CSCF further registers the UE on the S-CSCF.

18 Claims, 8 Drawing Sheets

LOCATION-BASED S-CSCF SELECTION IN AN IMS NETWORK

BACKGROUND

A telecommunication network operator may divide its network into multiple independent regions to improve the network latency, limit the possible outages to a same region, and improve the granularity of the network analytics, etc. In some cases, different regions may have the network elements physically located within the region including but not limited to, interrogating call session control function (I-CSCF) servers, proxy call session control function (P-CSCF) servers, serving call session control function (S-CSCF) servers, application servers, etc. The network elements of a region can be geographically located at different sites but all these sites shall be within the same region.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Techniques for a location-based S-CSCF selection in an IMS network are disclosed herein. In some implementations, a method for implementing the location-based S-CSCF selection may be implemented on a server device in an IMS network, for example, the I-CSCF server. As discussed herein, a telecommunication network or one or more subsystems of the telecommunication network of the wireless operators may be logically divided into multiple regions to cover the entire serving area. According to an implementation, an I-CSCF server of an IMS network receives a request to register a user equipment (UE) to use IP multimedia service. The request may be a session initiation protocol (SIP) register. The I-CSCF server determines that the UE is located in a first region based on the geographic information in the request. The I-CSCF server may determine, based at least in part on the cell global identity (CGI) information in the SIP register, that the UE is previously registered through a different region. The I-CSCF server may determine an S-CSCF server located in the first region to provide the IP multimedia service to the UE. The I-CSCF server further registers the UE on the S-CSCF server of the IMS network of the first region.

In some implementations, if the UE is determined to have previously registered on an S-CSCF server of a different region, the I-CSCF server may select an S-CSCF server that from a list of available S-CSCF servers located in the current region based on the registration request and the capabilities of the list of the S-CSCF servers.

In some implementations, if the UE is determined to have previously registered on an S-CSCF server of a different region, the I-CSCF server may query a domain name server (DNS) for a suitable S-CSCF server located in the current region to provide the service to the UE.

In some implementations, the SIP register may include the CGI used for 2G/3G technology, an evolved universal mobile telecommunications system terrestrial radio access (E-UTRA) cell global identity (ECGI) used for 4G/4G LTE technology, or a new radio (NR) CGI used for 5G technology.

In some implementations, the I-CSCF server may send an authentication request to an HSS. If the UE was previously registered on the IMS network, the HSS provides a previous S-CSCF server to the I-CSCF server. The I-CSCF server may compare the previous S-CSCF server with a set of S-CSCF servers located in the region. When there is no match between the previous S-CSCF server with the set of S-CSCF servers, the I-CSCF server may determine that the UE was previously registered on a different region. The I-CSCF server then selects an S-CSCF server from a set of known S-CSCF severs in the region to provide the service to the UE. Alternatively, or additionally, the I-CSCF server may query the DNS for the S-CSCF server to provide the service to the UE.

As discussed herein, it is desired that the UE is registered across the 4G/5G network nodes of a same region. However, it has been observed that the subscribers at the edges of these regions may register on the network nodes of two or more different regions. It particularly happens when the UE loses its radio connection on the RAN of one region and reconnects to the RAN of a different region or when the UE handovers to a different region. The registration on different regions causes more IP hops between the network elements and longer call setup time, which may lead to degraded network latency and customer experience. The present disclosure provides solutions to determine a suitable S-CSCF for the UE that is re-registering on the network. Not only the present disclosure considers a previous S-CSCF assigned to provide the service to the UE, but the present disclosure also considers the location of the previous S-CSCF and the current location of the UE. When the UE is re-registering on a different region, the present disclosure selects a new S-CSCF from the current region instead of assigning the previous S-CSCF to the UE. Therefore, the present disclosure can improve the network performance by decreasing the network latency, more efficiently setting up the phone call and/or routing the data traffic and limiting the call failure within the same region.

The techniques discussed herein may be implemented in a computer network using one or more of protocols including but are not limited to Ethernet, 3G, 4G, 4G LTE, 5G, 6G, the further radio access technologies, or any combination thereof. In some examples, the network implementations may support standalone architectures, non-standalone architectures, dual connectivity, carrier aggregation, etc. Example implementations are provided below with reference to the following figures.

Figure 1:
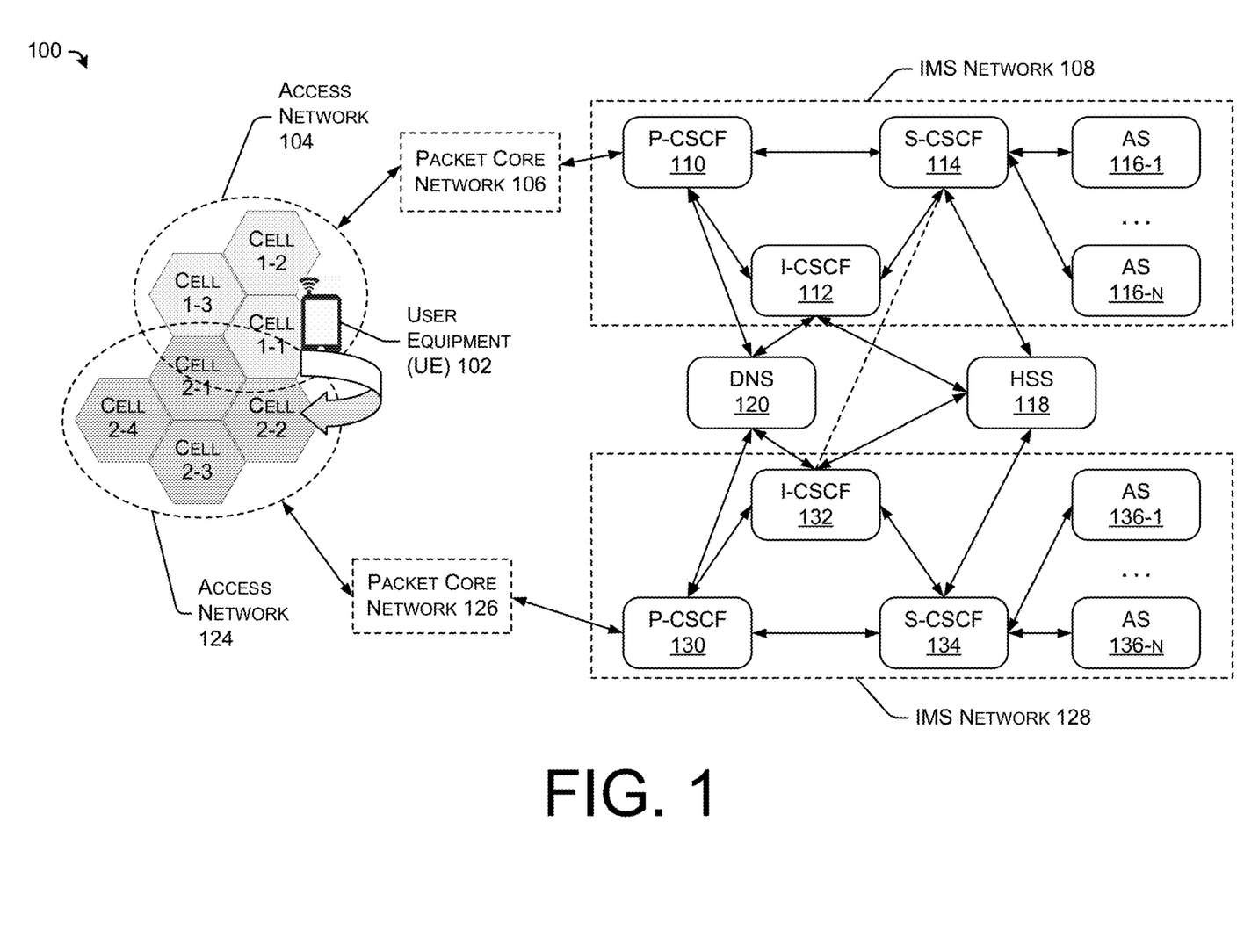
FIG. 1 illustrates an exemplary network scenario, in which methods for location-based S-CSCF selection in an IMS network are implemented.

FIG. 1 illustrates an exemplary network scenario, in which methods for location-based S-CSCF selection in an IMS network are implemented.

The network scenario 100, as illustrated in FIG. 1 may include a telecommunication network of a wireless service provider such as, T-Mobile, AT&T, Sprint, Verizon Wireless, etc. The telecommunication network or one or more subsystems of the telecommunication network may be logically divided to multiple regions. By way of example and without limitation, the network scenario 100 illustrates two regions of a telecommunication network. A first region (hereinafter referred to as Region #1) of the telecommunication network may include an access network 104, a packet core network 106, and an IMS network 108. A second region (hereafter referred to as Region #2) of the telecommunication network may include an access network 124, a packet core network 126, and an IM S network 128.

Taking the access network 104 of Region #1 as an example, the access network may be compatible with one or more radio access technologies, protocols, and/or standards, such as 5G NR technology, LTE/LTE Advanced technology, other Fourth Generation (4G) technology, High-Speed Data Packet Access (HSDPA)/Evolved High-Speed Packet Access (HSPA+) technology, Universal Mobile Telecommunication System (UMTS) technology, Code Division Multiple Access (CDMA) technology, Global System for Mobile Communications (GSM) technology, WiMAX technology, Wi-Fi technology, and/or any other previous or future generation of radio access technology. As such, the access network may be a radio access network (RAN) that includes various types of base stations, for example, 2G base stations and/or 3G NodeBs that are associated with GSM and CDMA access network, eNBs that are associated with an LTE access network known as an Evolved UMTS Terrestrial Radio Access Network (E-UTRAN), or gNBs or as new radio (NR) base stations that are associated with a 5G access network.

Each RAN comprises a plurality of cell areas covered by respective base stations within the RAN. By way of example and without limitation, the access network 104 of Region #1 includes cell 1-1, cell 1-2, and cell 1-3 and the access network 124 of Region #2 includes cell 2-1, cell 2-2, cell 2-3, and cell 2-4. As illustrated in FIG. 1, a user equipment (UE) 102 located in Region #1 may connect to the telecommunication network via cell 1-1 of the access network 104 while at a later time, the UE 102 may be observed to connect to the telecommunication network via cell 2-2 of the access network 124.

The packet core network (e.g., the packet core network 106 of Region #1 or the packet core network 126 of Region #2) may include an evolved packet core network (EPC) for 4G/4G LTE radio access technology or a packet core network (PCN) for 5G radio access technology. The EPC for 4G LTE network acts as a framework configured to provide converged voice and data on a 4G/4G LTE network. The PCN for 5G network uses a cloud-aligned service-based architecture (SBA) to support authentication, security, session management and aggregation of traffic from connected devices. In some examples, the PCN of 5G network enables a co-existence of the 5G network with the previous generation network facilities of 2G, 3G, 4G, or 4G/LTE networks, etc.

The IMS network (e.g., the IMS network 108 of Region #1 or the IMS network 128 of Region #2) may include multiple elements that function to deliver multimedia communications services such as voice, video and text messaging over the IP networks. For example, the IMS network 108 of Region #1 may include a proxy call session control function (P-CSCF) 110, an interrogating call session control function (I-CSCF) 112, a serving call session control function (S-CSCF) 114, and one or more application servers (AS) 116-1, . . . , 116-N (hereinafter referred to as application server 116).

The IMS network 128 of Region #2 may include a P-CSCF 130, an I-CSCF 132, an S-CSCF 134, and one or more application servers (AS) 136-1, . . . , 136-N (hereinafter referred to as application server 136). In some examples (not shown in FIG. 1), the IMS network (e.g., the IMS network 108 of Region #1 or the IMS network 128 of Region #2) may each include an access transfer control function (ATCF) that provides an anchor point for session initiation protocol (SIP) signaling, and an access gateway transfer (ATGW) that provides another anchor point for the real-time transport protocol (RTP) stream. In some implementation, the ATCF may be integrated to the P-CSCF or communicatively connected to the P-CSCF.

As discussed herein, the UE 102 may need to be registered on the IMS network in order to use the IP multimedia service. As illustrated in FIG. 1, the UE 102 connects to the telecommunication network through the access network 104 and registers on the packet core network 106 of Region #1. A registration request from the UE 102 can be further sent to the P-CSCF 110 of the IMS network 108 of Region #1. In some examples, the registration request is received at the ATCF implemented on the P-CSCF 110. The P-CSCF 110 forwards the registration request to the I-CSCF 112. Upon receiving the registration request, the I-CSCF 112 can send a user authentication request to a home subscriber server (HSS) 118 to authenticate the UE 102 to receive the IP multimedia service. In response, the HSS 118 can return a user authentication answer (UAA) that indicates whether the UAR is approved.

In some examples, if it is the first registration request from the UE, the HSS 118 does not assign the S-CSCF for the UE 102. In yet some other examples, the HSS 118 may provide to the I-CSCF 112 the information of the S-CSCF that is suitable to provide the service to the UE 102, for example, S-CSCF 114. The I-CSCF 112 then forwards the registration request to the S-CSCF 114, causing the S-CSCF 114 to complete the registration of the UE 102 on the S-CSCF 114 and store the registration information on the HSS 118. Once the registration is complete, the UE 102 can access the application server 116 located in Region #1.

In some examples, the P-CSCF 110 may query a domain name server (DNS) 120 to discover a fully qualified domain name (FQDN) or the IP address of the I-CSCF 112 so as to forward the registration request from the UE 102. The I-CSCF 112 may also query the DNS 120 to obtain the FQDN or the IP address of the S-CSCF 114 to forward the registration request to complete the registration of the UE 102.

In some examples, the UE 102 connects through the access network 104 of Region #1 but loses connection afterwards. At a later time, the UE 102 is observed to appear on the access network 124 of Region #2. It may be caused by a handover from Region #1 to Region #2. In some circumstances, it may be caused by a cell re-selection during the motion of the UE 102. In existing implementations, when the UE 102 tries to register on the IMS network 128 of Region #2, an S-CSCF previously served the UE 102 is provided by the HSS 118 to the I-CSCF 132 of Region #2. As the UE 102 is previously registered on the IMS network 108 of Region #1, information of the S-CSCF 114 of Region #1 was previously saved in the HSS 118 and is now provided to the I-CSCF 132 of Region #2. The UE 102, while located in Region #2, is then registered on the S-CSCF 114 of Region #1 and connected to the application servers 116 in Region #1. The registration on both Region #1 and Region #2 may cause degraded network latency due to more IP hops, longer call setup time, or possible failed call set up, etc. To avoid this type of cross-region registration, the present disclosure provides solutions to re-register the UE on a suitable S-CSCF located in the same region with the UE, regardless the S-CSCF that previously provided the service to the UE.

The UE 102 may be any device that can wirelessly connect to a telecommunication network. In some examples, the UE may be a mobile phone, such as a smart phone or other cellular phone. In other examples, the UE may be a personal digital assistant (PDA), a media player, a tablet computer, a gaming device, a smart watch, a hotspot, a personal computer (PC) such as a laptop, desktop, or workstation, or any other type of computing or communication device. In yet other examples, the UE may include the computing devices implemented on the vehicle including but are not limited to, an autonomous vehicle, a self-driving vehicle, or a traditional vehicle capable of connecting to internet. In yet other examples, the UE may be a wearable device and/or wearable materials, such as a smart watch, smart glasses, clothes made of smart fabric, etc. It should be appreciated that the examples of UE discussed herein are merely for illustrative purposes. The present disclosure is not intended to be limiting. Any objects that are configured with communication capabilities to connect to Internet can be used as the user equipment.

It should be understood that the network scenario shown in FIG. 1 is for the purpose of illustration. The present disclosure is not intended to be limiting. A telecommunication network or one or more subsystems of the telecommunication network can be logically divided into any number of regions. The techniques discussed herein may be implemented in the telecommunication network using one or more of protocols including but are not limited to Ethernet, 3G, 4G, 4G LTE, 5G, or any combination thereof. The techniques may be implemented in the telecommunication network using 6G and/or future radio access technologies. Further, although the IMS network (e.g., the IMS network 108 and 128) as shown in FIG. 1 includes a single P-CSCF, a single S-CSCF, and a single I-CSCF, the IMS network can include two or more P-CSCFs, S-CSCFs, and I-CSCFs. In some examples, the DNS 120 may be configured as a central domain name server that serve the entire network. In some other examples, the DNS 120 may be a plurality of distributed domain name servers that serve the individual regions, respectively.

Figure 2:
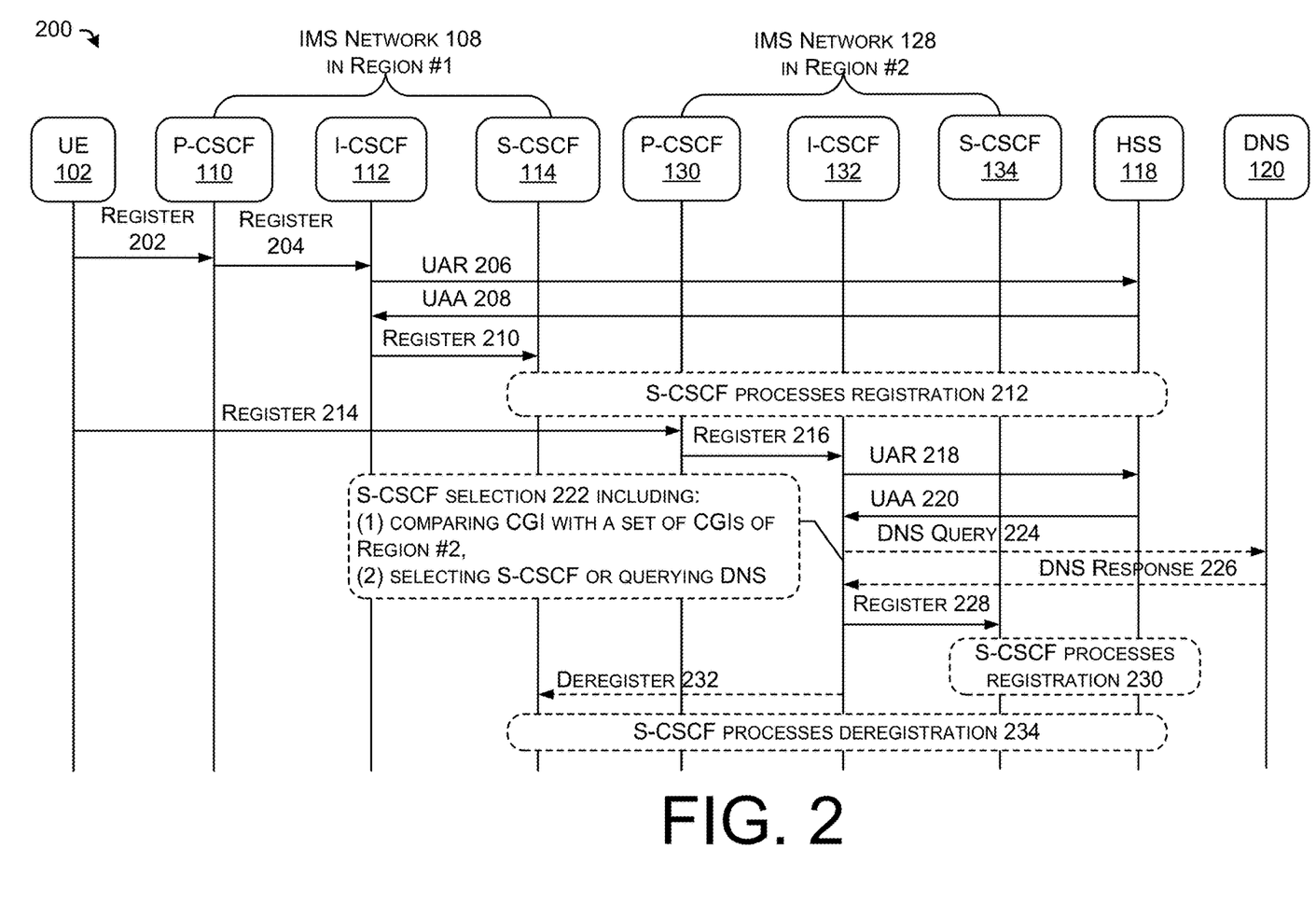
FIG. 2 illustrates an exemplary scenario for location-based S-CSCF selection in an IMS network according to an example of the present disclosure.

FIG. 2 illustrates an exemplary scenario for location-based S-CSCF selection in an IMS network according to an example of the present disclosure.

According to the scenario 200 as illustrated in FIG. 2, the UE 102 may start an initial registration or a first registration in Region #1 of a telecommunication network. The UE 102 may send a register (at 202) to the P-CSCF 110, requesting to register the UE 102 to use the IMS network resources. The register may be a session initiation protocol (SIP) register used to signal and control the interactive communication sessions. The register (i.e., the SIP register) may include a P-Access-Network-Info (PANI) header that indicates to the IMS network over which access technology the UE 102 is attached to the IMS network and the location of the UE 102. In some examples, the register may also include identity information when requesting to use the IP multimedia service such as IP multimedia private identity (IMPI) and IP multimedia public identity (IMPU). The register may further include a timer indicating it is the initial registration or the first registration of the UE 102 on the telecommunication network. The register is then forwarded to the I-CSCF 112 (at 204). Although not shown in FIG. 2, the P-CSCF 110 may query the DNS 120 to find the I-CSCF 112 to forward the register. The P-CSCF 110 may send a DNS query to the DNS 120, requesting the FQDN or the IP address of I-CSCF. The DNS 120 then sends a response to P-CSCF 110 with the FQDN or the IP address of I-CSCF 112.

Upon receiving the register, the I-CSCF 112 may send a user authorization request (UAR) to the HSS 118 (at 206) for the registering endpoint (i.e., the UE 102) to determine if the user is allowed to receive the service. The UAR may be a Diameter UAR message defined by 3GPP standards that is configured to indicate to the HSS 118 whether it is a first registration or a subsequent registration. The UAR (e.g., the Diameter UAR message) may also include the S-CSCF capabilities for the HSS 118 to determine a suitable S-CSCF to provide the service to the UE 102. The HSS 118 may return a user authorization answer (UAA) to the I-CSCF 112 to authorize using of the IP multimedia service (at 208). In some examples, for the first registration, the HSS 118 may not return a specific S-CSCF. The I-CSCF 112 may select the S-CSCF based on the capabilities of the available S-CSCFs in Region #1. In some other examples, when no specific S-CSCF is assigned, the I-CSCF 112 may rely on a central domain name server or the domain name server of the same region to find the S-CSCF based on the capabilities.

Once the S-CSCF is selected (e.g., S-CSCF 114), the I-CSCF 112 may send the register to the S-CSCF 114 (at 210) to process the registration for the UE 102 (at 212). The registration process (at 212) may include multiple message exchanges between the S-CSCF 114, the UE 102, and the HSS 118. For example, the S-CSCF 114 may challenge the UE 102 for authentication information. Upon receiving the authentication response, the S-CSCF 114 determines whether the authentication is successful. If the authentication is successful, the S-CSCF 114 may send a register to the HSS 118. The HSS 118 then registers the UE 102 on the S-CSCF 114 and sends a message to the S-CSCF 114 indicating that the registration is complete. The S-CSCF 114 may retrieve the specific service request from the register and filter the registration request to different application servers (e.g., AS 116 in FIG. 1) based on the specific service request from the UE 102.

As discussed herein, the location of the UE 102 may change from time to time. The UE 102 may roam to a different region causing a handover from Region #1 to Region #2. In some circumstances, a current session of the UE 102 may be disconnected. The UE 102 may disappear from the access network of Region #1 and re-appear on the access network of Region #2. Once the UE 102 is on the access network of Region #2, the UE 102 sends a request to re-register the UE to continue using the IMS network resources. As shown in FIG. 2, after the first registration on the IMS network 108 of Region #1, the UE 102, currently located in Region #2, may send a register (at 214) to the P-CSCF 130 in Region #2. Similar to the first registration, the register may be a SIP register. The register may also indicate to the P-CSCF 130 that it is a re-registration or a subsequent registration, for example, using a timer shorter than the first registration. As discussed herein, the PANI header of the SIP register may further include the location information the UE 102. The P-CSCF 130 forwards the register to the I-CSCF 132 in the IMS network 128 of Region #2. The P-CSCF 130 may query the DNS 120 or through other mechanism to discover the I-CSCF to forward the register to the I-CSCF (e.g., I-CSCF 132). The I-CSCF 132 may send an UAR to the HSS 118 (at 218) and receive an UAA from the HSS 118 (at 220). Because it is a re-registration or a subsequent registration, the HSS 118 returns to the I-CSCF 132 a previous S-CSCF on which the UE 102 was registered.

In some examples, the I-CSCF 132 may determine whether the UE 102 is located in the same region as the previous S-CSCF. The I-CSCF 132 may retrieve the location information of the UE 102 from the register. In implementations, the I-CSCF 132 may retrieve, from the PANI header of the SIP register, a cell global identity (CGI) that indicates the cell information through which the UE 102 connects to the access network. In some examples, the PANI header of the SIP register may include (E-UTRA) cell global identity (ECGI) used for 4G/4G LTE technology, or a new radio (NR) CGI used for 5G technology. For example, the retrieved CGI may indicate that the UE 102 is located in cell 2-2 of the access network 124 of Region #2 (shown in FIG. 1). The I-CSCF 132 may compare the retrieved CGI with a set of known CGIs of Region #2. If there is no match between the retrieved CGI and the set of known CGIs of Region #2, the I-CSCF 132 determines that the UE 102 is accessing from a different region and may reject the request and ignore the previous S-CSCF provided by the HSS 118. If there is a match between the retrieved CGI and the set of known CGIs of Region #2, the I-CSCF 132 then selects an S-CSCF located in Region #2 to provide the service to the UE 102.

The I-CSCF 132 may maintain a list of S-CSCFs located in the IMS network 128 of Region #2. The list of S-CSCFs may include one or more of the description/name of each S-CSCF, the FQDN of each S-CSCF, the IP address of each S-CSCF, or the respective capabilities of each S-CSCF to support various types of IP multimedia service. The respective capabilities of each S-CSCF may indicate the relationship of the specific S-CSCF and one or more application servers in the same region. The selection of the S-CSCF may be based on the capabilities of the S-CSCF and the service requested by the UE 102. For example, the I-CSCF 132 may select an S-CSCF related to one or more application servers that are capable to support the online video game stream.

In some examples, the I-CSCF 132 may rely on the DNS 120 to assign an S-CSCF to provide the service to the UE 102. The I-CSCF 132 may send a DNS query to the DNS 120 (at 224) and receives a DNS response (at 226). Once the S-CSCF is determined for the re-registration (e.g., S-CSCF 134), the I-CSCF 132 may send the register to the S-CSCF 134 (at 228) to process the registration for the UE 102 on the HSS 118 (at 230).

It should be understood that the first registration on the IMS network 108 of Region #1 and the re-registration/subsequent registration on the IMS network 128 of Region #2 shown in FIG. 2 are for illustration purposes. The present disclosure is not intended to be limiting. The first registration and any re-registration/subsequent registration of the UE 102 may occur in the same region. When the I-CSCF 132 compares the CGI of the re-registration SIP register with a set of known CGIs of Region #2, if there is a match, the I-CSCF 132 may determine that the UE 102 was previously registered on Region #2 and re-register the UE 102 on the previous S-SCSF to continue receiving the IP multimedia service.

In some examples, the I-CSCF 132 may further initiate a process to deregister the UE 102 from the previous S-CSCF (e.g., the S-CSCF 114) to prevent a stale subscriber issue on the previous S-CSCF. In implementations, the I-CSCF 132 may send a deregister to the previous S-CSCF 114 (at 232). The deregister can also be a SIP register message but with an expiration time of zero second. The S-CSCF 114 then process deregistration (at 234). The deregistration between the previous S-CSCF 114 and the HSS 118 may follow the same process as the first registration and the subsequent registration. After the deregistration is complete, the registration of the UE 102 on the previous S-CSCF 114 is removed from the HSS 118.

Figure 3:
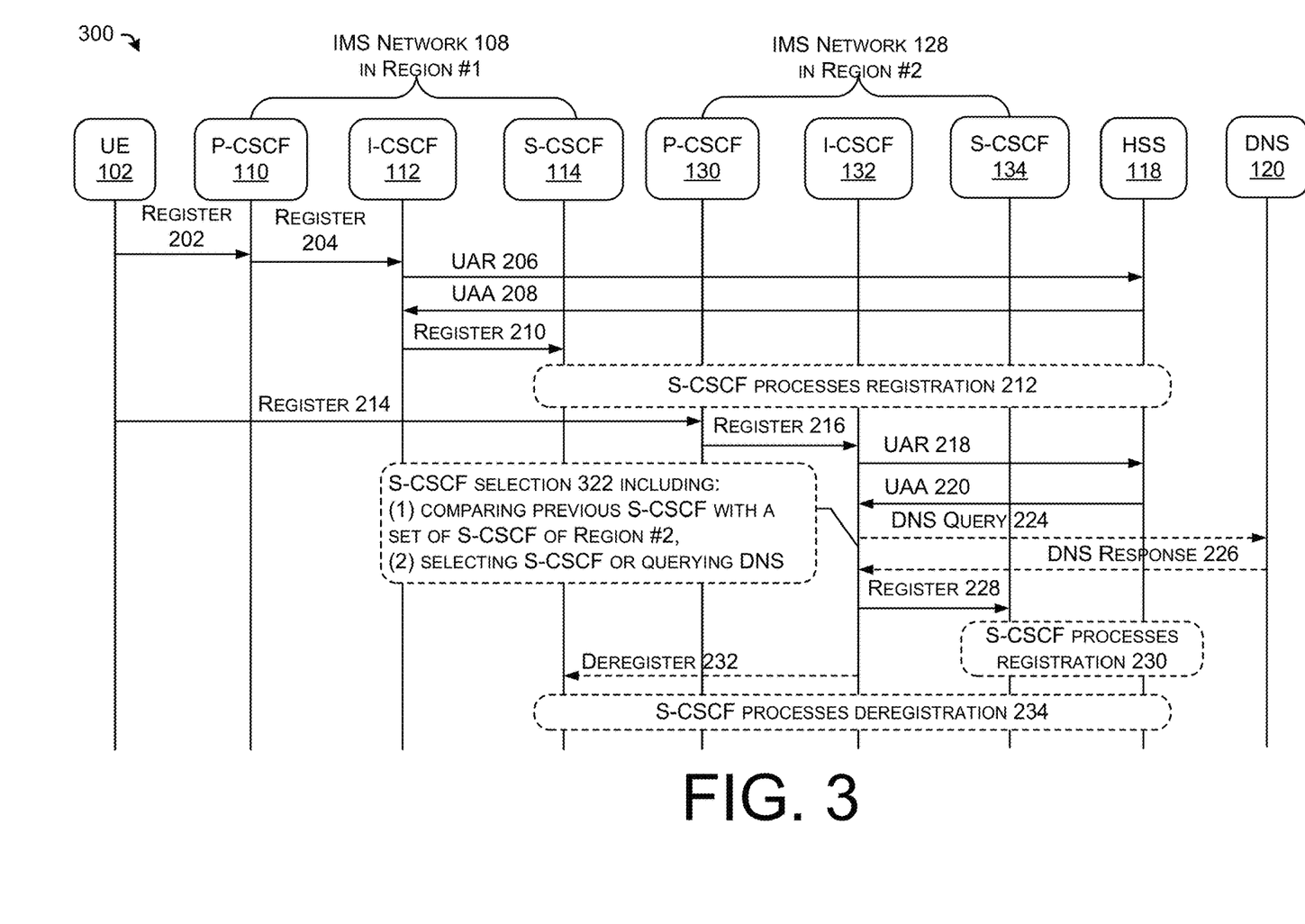
FIG. 3 illustrates another exemplary scenario for location-based S-CSCF selection in an IMS network according to an example of the present disclosure.

FIG. 3 illustrates another exemplary scenario for location-based S-CSCF selection in an IMS network according to an example of the present disclosure.

According to the scenario 300 as illustrated in FIG. 3, the UE 102 is initially registered on the IMS network 108 of Region #1 and re-registered on the IMS network 128 of Region #2. The initial registration and the re-registration processes are similar to the scenario 200 as illustrated in FIG. 2. However, the scenario 300 uses different mechanisms to determine the previously registered S-CSCF for the UE 102.

Instead of (or in addition to) using the CGI information in the SIP register PANI header, the I-CSCF 132 of the IMS network 128 of Region #2 uses a list of known S-CSCF information to determine whether the UE 102 was previously registered on an S-CSCF of a different region. In some examples, the I-CSCF 132 may maintain a list of S-CSCFs located in Region #2. Upon receiving the UAA from the HSS 118 with the information of a previous S-CSCF assigned to the UE 102 (at 220), the I-CSCF 132 may compare the previous S-CSCF with the list of S-CSCFs located in Region #2. If there is a match, the I-CSCF 132 determines that the UE 102 was previously registered in the same region and re-register the UE 102 to the previous S-CSCF.

If there is no match between the previous S-CSCF and the list of S-CSCFs, the I-CSCF 132 determines that the UE 102 previously was not registered on Region #2. The I-CSCF 132 may select the S-CSCF (at 322) from the list of S-CSCFs located in Region #2. The I-CSCF 132 may investigate the register to discover what types of service are requested. In some examples, the selection of an S-CSCF may be based on the relative locations of the S-CSCFs to the UE 102 within Region #2. Alternatively or additionally, and the selection of the S-CSCF may be based on the types of service being requested and the capabilities of the S-CSCFs. In some examples, the I-CSCF 132 may query a domain name server (e.g., DNS 120) to find the S-CSCF that has the capabilities to provide the service to the UE 102.

It should be appreciated that the scenarios illustrated in FIGS. 2-3 are for the illustrative purposes. The present disclosure is not intended to be limiting. The I-CSCF may send the information associated with the S-CSCF capabilities and locations to the HSS 118 and rely on the HSS 118 to assign the S-CSCF to the UE 102. In some examples, the information related to the set of known CGI and/or the set of known S-CSCFs may be stored on the HSS 118 or other servers in the IMS network.

FIGS. 4-7 illustrate various example processes for location-based S-CSCF selection in an IMS network according to the examples of the present disclosure. By way of example and without limitation, the processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined (or omitted) in any order and/or in parallel to implement the processes. In some examples, multiple branches represent alternate implementations that may be used separately or in combination with other operations discussed herein.

Figure 4:
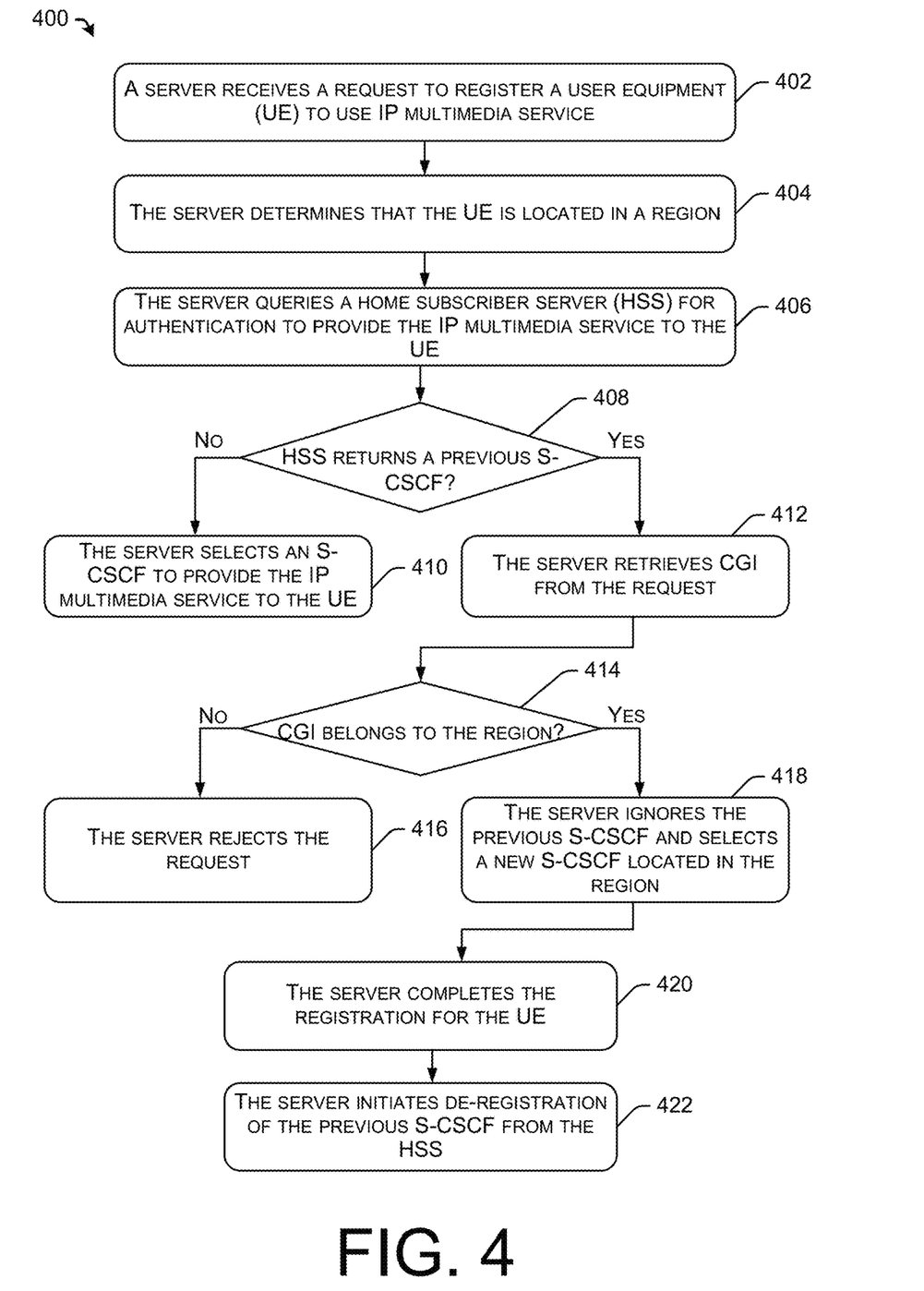
FIG. 4 illustrates an exemplary process for location-based S-CSCF selection in an IMS network according to an example of the present disclosure.

FIG. 4 illustrates an exemplary process for location-based S-CSCF selection in an IMS network according to an example of the present disclosure. The process 400 as illustrated in FIG. 4 may correspond to one scenario for location-based S-CSCF selection in an IMS network as illustrated in FIG. 2. The process 400 uses CGI, ECGI, or nCGI information in the SIP register to determine over which cell are of the access network the UE connects to the IMS network. The I-CSCF further select a suitable S-CSCF in the current region to provide the service to the UE.

At operation 402, a server receives a request to register a user equipment (UE) to use IP multimedia service. The server may be an IMS network function server. As discussed herein, the server may be an I-CSCF server in the IMS network (e.g., I-CSCF 114 or I-CSCF 134 as shown in FIGS. 1-3). The UE can be any types of computing device that a subscriber uses to access the network resources (e.g., UE 102 as shown in FIGS. 1-3). The UE may connect to a 4G/5G telecommunication network though an access network of the 4G/5G telecommunication network. The access network may include a radio access network (RAN) compatible with various radio access technologies including but not limited to, GSM, CDMA, UMTS, HSDPA, 4G/4G LTE, 5G NR technology, WiMAX technology, Wi-Fi technology, and/or any other previous or future generation of radio access technology.

Once the UE is on the RAN of the 4G/5G telecommunication network, the UE may send a registration request, which passes through the RAN and a packet core network to a P-CSCF of the IMS network. The packet core network may include an evolved packet core network (EPC) of 4G/4G LTE network, a 5G core network, etc. The registration request may be a session initiation protocol (SIP) register (also referred to as a SIP signaling). In some examples, the SIP register may be received at an access transfer control function (ATCF) server communicatively connected to the P-CSCF, which acts as an anchor point of an IMS network. The SIP register is then sent to the I-CSCF of the IMS network.

At operation 404, the server determines that the UE is located in a region. As discussed herein, the telecommunication networks of various operators may be logically divided into multiple regions to cover the US territories. The boundaries of the multiple regions may be defined using the geographical boundary information such as the longitude, the latitude information, or the combination thereof. In some examples, the boundaries of the multiple regions may be defined using a boundary information of a city or a county, the streets, rivers, mountains, valleys, etc. In some examples, the SIP register may include one or more of a subscriber's identification, address of record (AOR), or one or more locations such as the IP addresses and the port numbers. By investigating into the SIP register information, the I-CSCF can determine that the UE is connected to a certain region of the telecommunication network.

At operation 406, the server queries a home subscriber server (HSS) for authentication to provide the IP multimedia service to the UE. In some example, I-CSCF sends a user authentication request (UAR) to the HSS (e.g., the HSS 118). The UAR may include the user information such as the username, AOR, locations, etc., and the registration information such as the types of services being requested. In response, the HSS may return a user authentication answer (UAA) to the I-CSCF.

At operation 408, the server determines whether the HSS returns a previous S-CSCF. As discussed herein, the SIP register may also indicate whether the request is for the first registration or a subsequent registration by setting different timer values. For the first registration of the UE, the HSS may not assign the S-CSCF for the UE. Thus, if the HSS does not return an S-CSCF, at operation 410, the server selects an S-CSCF to provide the IP multimedia service to the UE. The I-CSCF may maintain a set of available S-CSCFs with their respective capabilities in the IMS network. Based on the service requested by the UE, the I-CSCF may determine an S-CSCF with the capability to provide the service to the UE.

If the SIP register indicates that the request is for a subsequent registration, the HSS discovers a previous S-CSCF assigned to the UE and sends the information of the previous S-CSCF in UAA to the I-CSCF. The information of the previous S-CSCF may include a name/description of the previous S-CSCF, a FQDN of the previous S-CSCF, or an IP address of the previous S-CSCF. At operation 412, the I-CSCF retrieves cell global identity (CGI) from the request. In some examples, the I-CSCF may retrieve the CGI information from the PANI header of the SIP register. For 4G/4G LTE technology, the PANI header of the SIP register may include ECGI information. For 5G NR technology, the PANI header of the SIP register may include nCGI information.

At operation 414, the server determines whether the CGI belongs to the region. As discussed herein, a radio access network of a region includes a plurality of cells to cover the entire area of the region. When the UE connects to a base station of a cell, the UE acquires the CGI information indicative of the cell identity. The I-CSCF of a region may maintain the information of a set of CGIs, ECGI, or nCGI associated with the region. The I-CSCF may determine whether the CGIs, ECGI, or nCGI belongs to the region by comparing the CGIs, ECGI, or nCGI in the PANI header of the SIP register with the set of CGIs, ECGIs, or nCGIs known to be associated with the region.

If there is no match between the CGI and the set of known CGIs, the I-CSCF may determine that the UE is accessing a RAN from a different region. At operation 416, the I-CSCF may reject the request. The I-CSCF also ignores the previous S-CSCF provided by the HSS in the UAA message.

If there is a match between the CGI, ECGI, or nCGI and the set of known CGIs, ECGIs, or nCGIs, the I-CSCF may determine that the UE is accessing the RAN in the same region. As the UAA from the HSS indicates that the UE was previously registered to an S-CSCF possibly not in the same region, the server ignores the S-CSCF and selects a new S-CSCF located in the region to provide the IP multimedia service to the UE at operation 418.

At operation 420, the server completes the registration for the UE. Once the S-CSCF is selected, the I-CSCF may send the registration request to the S-CSCF. In some examples, the S-CSCF (e.g., S-CSCF 134 in Region #2) may send a message to the UE, challenging for the authentication information. If the authentication is successful, the S-CSCF may send a register to the HSS. The HSS then registers the UE on the S-CSCF and returns a message to the S-CSCF indicating the registration is complete. The registration information indicative of the UE being registered on the S-CSCF is saved in the HSS. The S-CSCF may filter the registration request to different application servers (e.g., AS 136 in FIG. 2) based on the requested service.

In some examples, to prevent a stale subscriber issue, the I-CSCF initiates de-registration of the previous S-CSCF from the HSS at operation 422. The I-CSCF may send another SIP register to the S-CSCF (i.e., the previous S-CSCF) with an expiration time of zero second to initiate the de-registration. Similar to the registration process, the previous S-CSCF (e.g., S-CSCF 114 of Region #1) then communicates with the HSS to remove the registration of the UE on the previous S-CSCF from the HSS.

Figure 5:
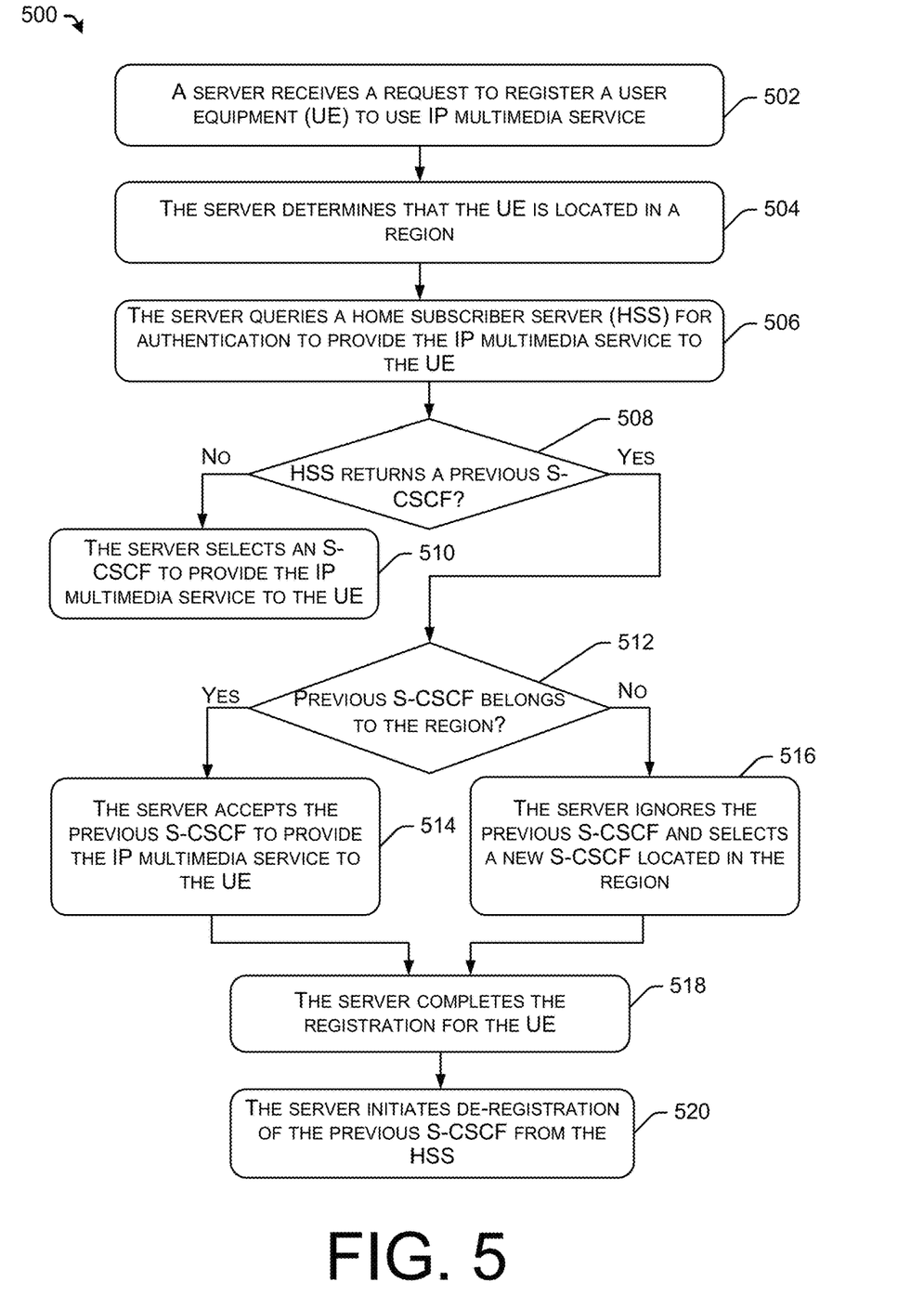
FIG. 5 illustrates another exemplary process for location-based S-CSCF selection in an IMS network according to an example of the present disclosure.

FIG. 5 illustrates another exemplary process for location-based S-CSCF selection in an IMS network according to an example of the present disclosure. The process 500 as illustrated in FIG. 5 is associated with one scenario for location-based S-CSCF selection in an IMS network as illustrated in FIG. 3. Instead of using the CGI information in process 400, the process 500 uses S-CSCF information to determine whether the UE roams from a different region. When it is determined that the UE was previously registered on a different region, the I-CSCF selects a suitable S-CSCF in the current region to provide the service to the UE. The operations of 502, 504, 506, and 508 are similar to the operations of 402, 404, 406, and 408, as illustrated in FIG. 4.

When it is determined that the HSS does not return an S-CSCF, at operation 510, the server selects an S-CSCF to provide the IP multimedia service to the UE. In general, if it is the first registration of the UE, the HSS does not have data related to previous registrations. In some examples, the HSS does not return the S-CSCF and I-CSCF will select the S-CSCF based on the registration and the capabilities of the available S-CSCFs. In other examples, the HSS may assign an S-CSCF and return the assigned S-CSCF to the I-CSCF.

When it is determined that the HSS returns an S-CSCF, at operation 512, the server determines whether the previous S-CSCF belongs to the region. The S-CSCF information returned by the HSS may include a description of the S-CSCF, a fully qualified domain name (FQDN) of the S-CSCF, or an IP address of the S-CSCF. In implementations, the server (e.g., I-CSCF) may compare the returned S-CSCF with a list of S-CSCFs known to be located in the region.

When there is a match between the S-CSCF and the list of S-CSCF known to be located in the region, the I-CSCF may determine that it is an initial registration of the UE or the UE is re-registering on the same region. At operation 514, the server accepts the S-CSCF to provide the IP multimedia service to the UE.

When there is no match between the S-CSCF and the list of S-CSCF known to be located in the region, the I-CSCF may determine that the UE was previously registered in the S-CSCF located in a different region. At operation 516, the server ignores the S-CSCF and selects a new S-CSCF located in the region to provide the IP multimedia service to the UE. The server may select the S-CSCF based on the registration request and the capabilities of the available S-CSCFs in the region.

The server further completes the registration for the UE at operation 518. In some examples, the server also initiates de-registration of the previous S-CSCF from the HSS at operation 520.

Figure 6:
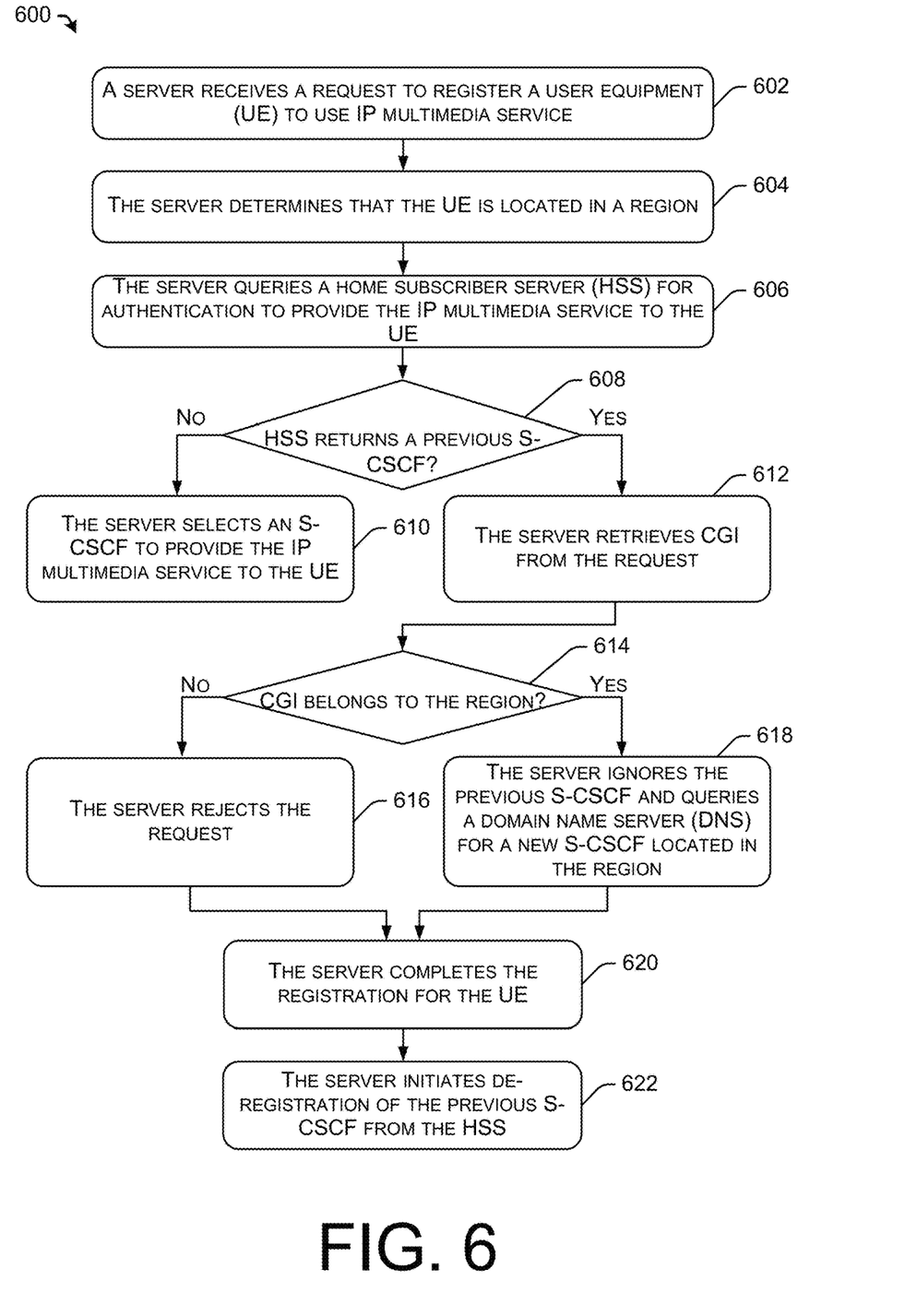
FIG. 6 illustrates another exemplary process for location-based S-CSCF selection in an IMS network according to an example of the present disclosure.

FIG. 6 illustrates another exemplary process for location-based S-CSCF selection in an IMS network according to an example of the present disclosure. The process 600 as illustrated in FIG. 6 is associated with another scenario for location-based S-CSCF selection in an IMS network as illustrated in FIG. 2. Similar to the process 400, the process 600 also uses CGI information in the SIP register to determine over which cell are of the access network the UE connects to the IMS network. However, according to the process 600, the I-CSCF queries a domain name server (DNS) for a new S-CSCF to provide the IP multimedia service to the UE, as illustrated at operation 618. The other operations shown in FIG. 6 are similar to the operations in FIG. 4, and thus, are not detailed herein.

Figure 7:
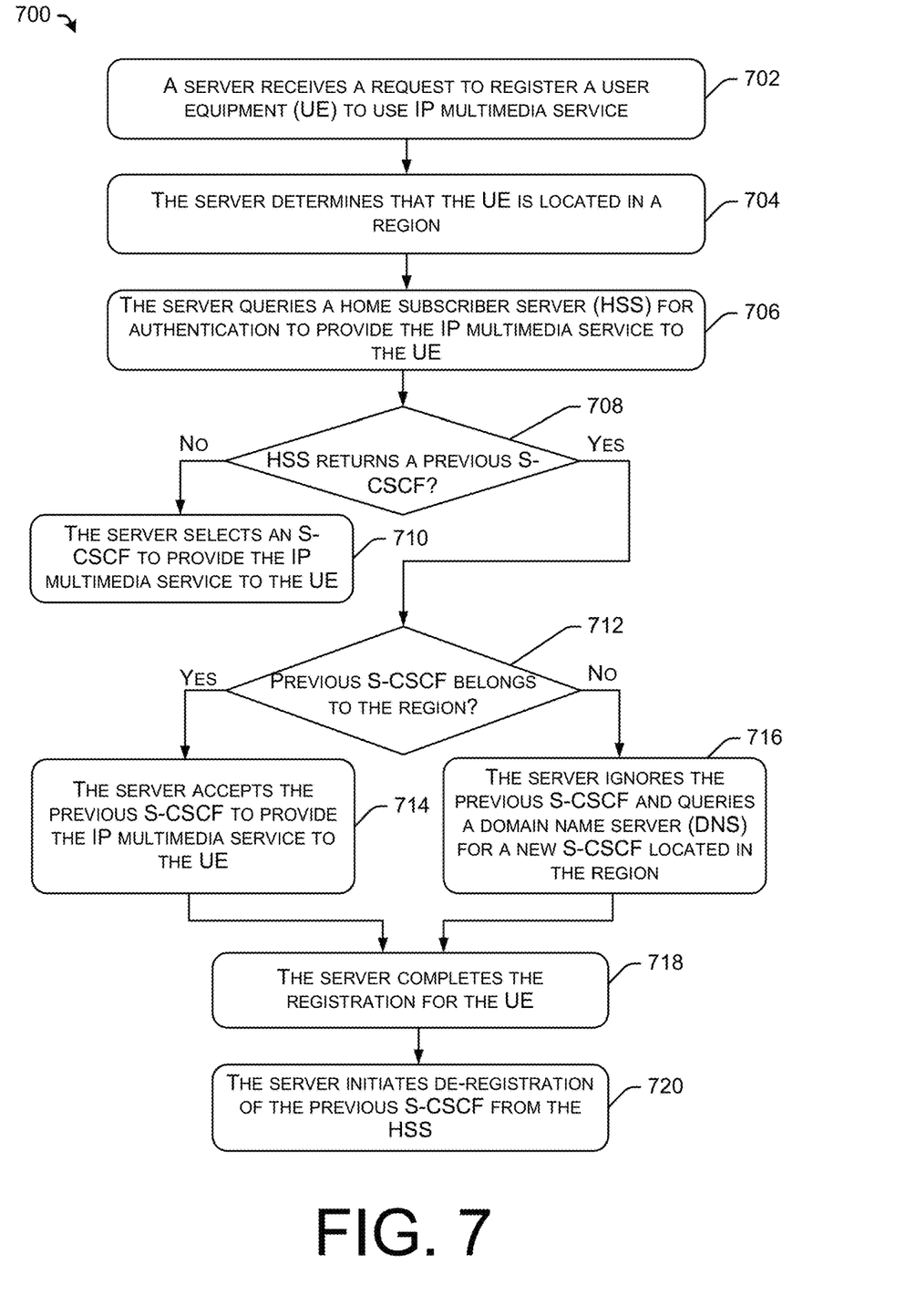
FIG. 7 illustrates another exemplary process for location-based S-CSCF selection in an IMS network according to an example of the present disclosure.

FIG. 7 illustrates another exemplary process for location-based S-CSCF selection in an IMS network according to an example of the present disclosure. The process 700 as illustrated in FIG. 7 is associated with another scenario for location-based S-CSCF selection in an IMS network as illustrated in FIG. 3. Similar to the process 500, the process 700 uses S-CSCF information to determine whether the UE roams from a different region. However, when it is determined that the UE was previously registered on a different region, the server (e.g., the I-CSCF) ignores the previous S-CSCF and queries a domain name server (DNS) for a new S-CSCF located in the region to provide the IP multimedia service to the UE, as illustrated at operation 716. The other operations shown in FIG. 7 are similar to the operations in FIG. 5, and thus, are not detailed herein.

Figure 8:
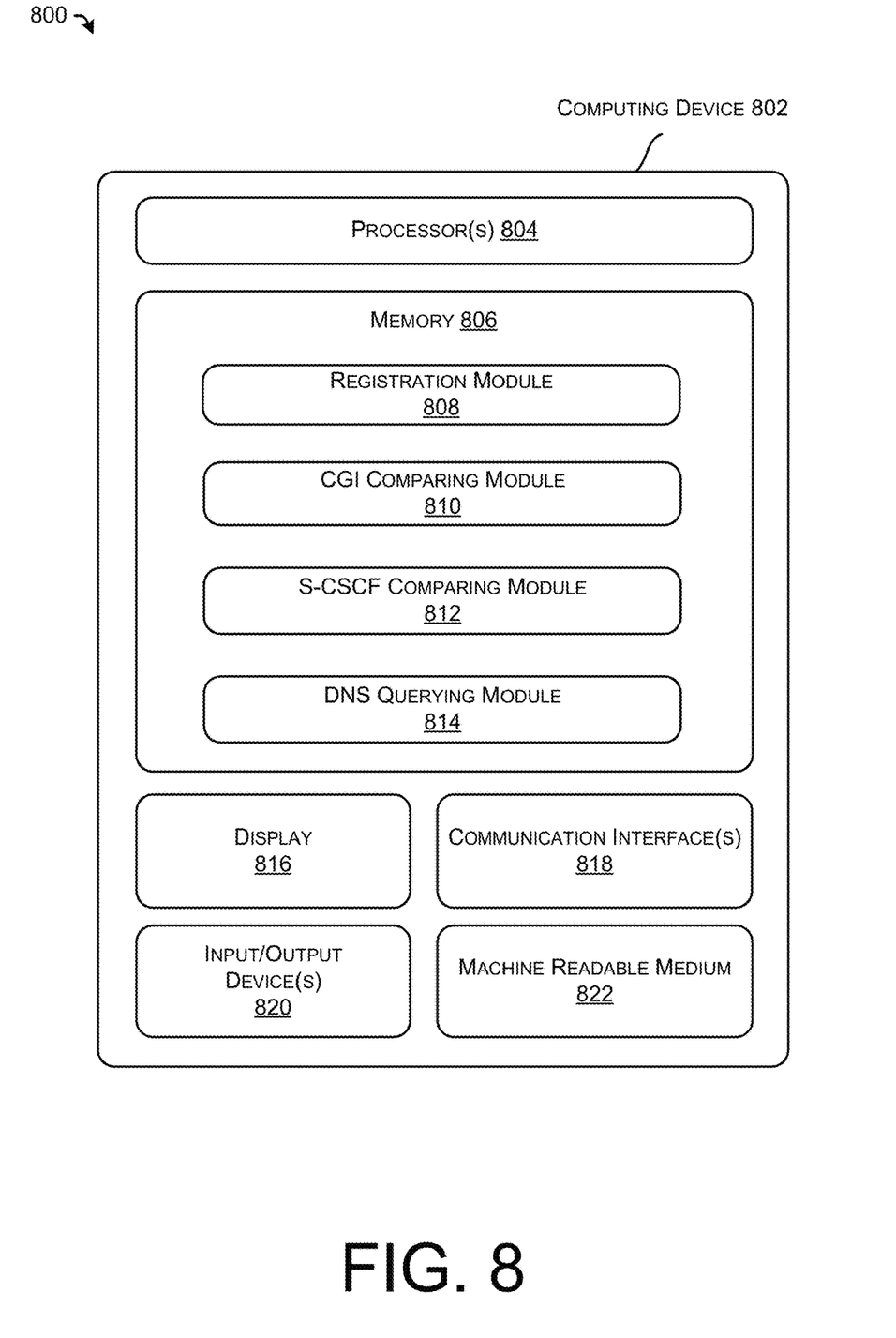
FIG. 8 illustrates an example server device, in which methods for location-based S-CSCF selection in an IMS network are implemented according to an example of the present disclosure.

FIG. 8 illustrates an example computing device, in which methods for location-based S-CSCF selection in an IMS network are implemented according to an example of the present disclosure. The computing device 802 may be a server device of an IMS network. As discussed herein, the computing device 802 may be an I-CSCF of an IMS network.

As illustrated in FIG. 8, a computing device 802 may comprise processor(s) 804, a memory 806 storing a registration module 808, a CGI comparing module 810, an S-CSCF comparing module 812, and a DNS querying module 814, a display 816, communication interface(s) 818, input/output device(s) 820, and/or a machine readable medium 822.

In various examples, the processor(s) 804 can be a central processing unit (CPU), a graphics processing unit (GPU), or both CPU and GPU, or any other type of processing unit. Each of the one or more processor(s) 804 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 804 may also be responsible for executing all computer applications stored in memory 806, which can be associated with common types of volatile (RAM) and/or nonvolatile (ROM) memory.

In various examples, the memory 806 can include system memory, which may be volatile (such as RAM), non-volatile (such as ROM, flash memory, etc.) or some combination of the two. The memory 806 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the computing device 802. Any such non-transitory computer-readable media may be part of the computing device 802.

The registration module 808 may be configured to process the registration of a user equipment (UE) on an IMS network. In some examples, the registration may be triggered when a subscriber makes a phone call through the UE, sends a text message, an audio, and/or a video through the UE, visits a website through a browser installed on the UE, launches an app installed on the UE, etc. Upon receiving a registration request, the registration module 808 may generate a user authentication request (UAR) to an HSS in the IMS network. After receiving the user authentication answer (UAA) from the HSS that authorize the UE to access the network resources, the registration module 808 may forward the registration request (e.g., a SIP register) to an S-CSCF assigned to the UE, causing the S-CSCF to complete the registration process with the HSS.

As discussed herein, for the first registration, the HSS may not provide the S-CSCF information in the UAA to I-CSCF while for the re-registration/subsequent registration, the HSS provides a previous S-CSCF information. The CGI comparing module 810 may be configured to process the CGI, ECGI, or nCGI information in the SIP register. In some examples, the CGI comparing module 810 may compare the CGI, ECGI, or nCGI in the SIP register with a set of known CGIs, ECGIs, or nCGIs in a region. If there is match between the CGI, ECGI, or nCGI in the SIP register and the set of known CGIs, ECGIs, or nCGIs, the S-CSCF comparing module 812 may further compare the previous S-CSCF with a set of known S-CSCFs in the region. If there is a match between the previous S-CSCF with the set of known S-CSCFs, the I-CSCF may determine that the re-registration/subsequent registration of the UE is sent from the same region as the previous registration. The I-CSCF may re-assign the previous S-CSCF to provide the service to the UE. If there is no match between the previous S-CSCF with the set of known S-CSCFs, the I-CSCF may determine that the UE was previously registered on a different region. It may be caused by a handover of the UE or a cell re-selection of the UE while roaming in the area. In some examples, the DNS querying module 814 may query a domain name server of the region or a central domain name server of the IMS network for an S-CSCF to be assigned to the UE.

The communication interface(s) 818 can include transceivers, modems, interfaces, antennas, and/or other components that perform or assist in exchanging radio frequency (RF) communications with base stations of the telecommunication network, a Wi-Fi access point, and/or otherwise implement connections with one or more networks. For example, the communication interface(s) 818 can be compatible with multiple radio access technologies, such as 5G radio access technologies and 4G/LTE radio access technologies. Accordingly, the communication interfaces 818 can allow the computing device 802 to connect to the 5G system described herein.

Display 816 can be a liquid crystal display or any other type of display commonly used in computing device 802. For example, display 816 may be a touch-sensitive display screen, and can then also act as an input device or keypad, such as for providing a soft-key keyboard, navigation buttons, or any other type of input. Input/output device(s) 820 can include any sort of output devices known in the art, such as display 816, speakers, a vibrating mechanism, and/or a tactile feedback mechanism. Input/output device(s) 820 can also include ports for one or more peripheral devices, such as headphones, peripheral speakers, and/or a peripheral display. Input/output device(s) 820 can include any sort of input devices known in the art. For example, input/output device(s) 820 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 822 can store one or more sets of instructions, such as software or firmware, that embodies any one or more of the methodologies or functions described herein. The instructions can also reside, completely or at least partially, within the memory 806, processor(s) 804, and/or communication interface(s) 818 during execution thereof by computing device 802. The memory 806 and the processor(s) 804 also can constitute machine readable media 822.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

CONCLUSION

Although the subject matter has been described in language specific to structural features and/or methodological acts, it is to be understood that the subject matter is not necessarily limited to the specific features or acts described above. Rather, the specific features and acts described above are disclosed as example examples.

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method implemented on an interrogating call session control function (I-CSCF) server, the method comprising:
   receiving a request to register a user equipment (UE) to use an IP multimedia service, the request including geographic information of the UE;
   determining, based at least in part on the geographic information, that the UE is located in a first region;
   determining, based at least in part on the request, that the UE is previously registered through a different region;
   comparing an authorized S-CSCF server associated with the previous registration of the UE with a set of S-CSCF servers located in the first region; and
   determining, based on the comparing, that there is no match between the authorized S-CSCF server and the set of S-CSCF servers;
   based on determining that there is no match, disregarding the authorized S-CSCF and determining a serving call session control function (S-CSCF) server from the set of S-CSCF servers to provide the IP multimedia service to the UE; and
   registering the UE on the S-CSCF server.

2. The method of claim 1, wherein determining the S-CSCF server from the set of S-CSCF servers to provide the IP multimedia service to the UE further comprises: querying a domain name server (DNS) for the S-CSCF server located in the first region.

3. The method of claim 1, further comprising:
   retrieving, from the request, an identifier related to the previous registration of the UE, wherein the identifier includes one of an evolved universal mobile telecommunications system terrestrial radio access (EUTRA) cell global identity (CGI) or a new radio (NR) CGI.

4. The method of claim 3, wherein determining, based at least in part on the request, that the UE is previously registered through the different region further comprises:
   comparing, as a comparison, the identifier with a set of identifiers associated with the first region; and
   determining, based on the comparison, that there is no match between the identifier and the set of identifiers.

5. The method of claim 1, further comprising:
   querying a home subscriber server (HSS) for the authorized S-CSCF server; and
   receiving, from the HSS, a response including information of the authorized S-CSCF server.

6. The method of claim 1, further comprising:
   sending a second request to the authorized S-CSCF server, the second request causing a de-registration of the UE from the authorized S-CSCF server.

7. The method of claim 1, wherein the first region is one of a plurality of regions in an IP multimedia subsystem (IMS) network.

8. The method of claim 1, further comprising:
   determining, from the set of S-CSCF servers located in the first region, the S-CSCF server based at least in part on respective capabilities of the set of S-CSCF servers.

9. A server comprising:
   one or more processors, and
   a non-transitory memory storing instructions executed by the one or more processors to perform actions including:
      receiving a request to register a user equipment (UE) to use an IP multimedia service, the request including geographic information of the UE;
      determining, based at least in part on the geographic information, that the UE is located in a first region;
      determining, based at least in part on the request, that the UE is previously registered through a different region;
      comparing an authorized S-CSCF server associated with the previous registration of the UE with a set of S-CSCF servers located in the first region; and
      determining, based on the comparing, that there is no match between the authorized S-CSCF server and the set of S-CSCF servers;
      based on determining that there is no match, disregarding the authorized S-CSCF and determining a serving call session control function (S-CSCF) server of the set of S-CSCF servers to provide the IP multimedia service to the UE; and
      registering the UE on the S-CSCF server.

10. The server of claim 9, wherein the instructions are executed by the processor to further perform actions including:
    querying a domain name server (DNS) for the S-CSCF server located in the first region.

11. The server of claim 9, wherein the instructions are executed by the processor to further perform actions including: retrieving, from the request, an identifier identity related to the previous registration of the UE, wherein the identifier includes one of an evolved universal mobile telecommunications system terrestrial radio access (EUTRA) cell global identity (CGI) or a new radio (NR) CGI.

12. The server of claim 11, wherein the instructions are executed by the processor to further perform actions including:
    comparing, as a comparison, the identifier with a set of identifiers associated with the first region; and
    determining, based on the comparison, that there is no match between the identifier and the set of identifiers.

13. The server of claim 9, wherein the instructions are executed by the processor to further perform actions including:
    querying a home subscriber server (HSS) for the authorized S-CSCF server; and
    receiving, from the HSS, a response including information of the authorized S-CSCF server.

14. The server of claim 9, wherein the instructions are executed by the processor to further perform actions including:
    sending a second request to the authorized S-CSCF server, the second request causing a de-registration of the UE from the authorized S-CSCF server.

15. One or more non-transitory computer-readable storage media storing computer-readable instructions, that when executed by one or more processors, cause the one or more processors to perform actions comprising:
- receiving a request to register a user equipment (UE) to use an IP multimedia service, the request including geographic information of the UE;
- determining, based at least in part on the geographic information, that the UE is located in a first region;
- determining, based at least in part on the request, that the UE is previously registered through a different region;
- comparing an authorized S-CSCF server associated with the previous registration of the UE with a set of S-CSCF servers located in the first region; and
- determining, based on the comparing, that there is no match between the authorized S-CSCF server and the set of S-CSCF servers;
- based on determining that there is no match, disregarding the authorized S-CSCF and determining a serving call session control function (S-CSCF) server of the set of S-CSCF servers to provide the IP multimedia service to the UE; and
- registering the UE on the S-CSCF server.

16. The one or more non-transitory computer-readable storage media of claim 15, wherein the instructions are executed by the one or more processors to further perform actions including:
- querying a domain name server (DNS) for the S-CSCF server located in the first region.

17. The one or more non-transitory computer-readable storage media of claim 15, wherein the instructions are executed by the one or more processors to further perform actions including:
- retrieving, from the request, an identifier identity related to the previous registration of the UE, wherein the identifier includes one of an evolved universal mobile telecommunications system terrestrial radio access (EUTRA) cell global identity (CGI) or a new radio (NR) CGI
- comparing, as a comparison, the identifier identity with a set of identifiers associated with the first region; and
- determining, based on the comparison, that there is no match between the identifier and the set of identifiers.

18. The one or more non-transitory computer-readable storage media of claim 15, wherein the instructions are executed by the one or more processors to further perform actions including:
- querying a home subscriber server (HSS) for the authorized S-CSCF server;
- receiving, from the HSS, a response including information of the authorized S-CSCF server.

* * * * *